(12) United States Patent
Jakobsmeyer

(10) Patent No.: US 11,007,924 B2
(45) Date of Patent: May 18, 2021

(54) ADJUSTING DEVICE FOR ADJUSTING A LIGHT MODULE IN A VEHICLE LIGHTING DEVICE

(71) Applicant: Hella GmbH & Co. KGaA, Lippstadt (DE)

(72) Inventor: Helmut Jakobsmeyer, Paderborn (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 142 days.

(21) Appl. No.: 16/256,059

(22) Filed: Jan. 24, 2019

(65) Prior Publication Data
US 2019/0241117 A1 Aug. 8, 2019

(30) Foreign Application Priority Data
Feb. 2, 2018 (DE) .......................... 102018102339.1

(51) Int. Cl.
*B60Q 1/068* (2006.01)
*F16B 31/02* (2006.01)

(52) U.S. Cl.
CPC ............ *B60Q 1/0683* (2013.01); *F16B 31/02* (2013.01)

(58) Field of Classification Search
CPC .............................. B60Q 1/0683; F16B 31/02
USPC ...................................................... 411/1, 6, 7
See application file for complete search history.

(56) References Cited

U.S. PATENT DOCUMENTS

| | | | | |
|---|---|---|---|---|
| 3,425,314 A * | 2/1969 | Ohlson | ................... | F16B 31/02 411/7 |
| 4,687,392 A * | 8/1987 | Bidwell | ................... | F16B 31/02 411/432 |
| 6,309,154 B1 * | 10/2001 | Higgins | ................ | F16B 31/027 411/7 |
| 6,450,674 B2 * | 9/2002 | Denley | ................ | B60Q 1/0683 362/282 |
| 6,773,153 B2 * | 8/2004 | Burton | ................ | B60Q 1/0683 362/528 |
| 7,438,457 B2 * | 10/2008 | Whynott | ................ | B60Q 1/068 362/524 |
| 10,266,107 B2 * | 4/2019 | Burton | ................ | F16H 25/2021 |
| 2012/0237312 A1 * | 9/2012 | Widule | ................ | F16B 31/027 411/7 |

FOREIGN PATENT DOCUMENTS

| | | |
|---|---|---|
| DE | 102004059276 A1 | 6/2006 |
| DE | 202010011852 U1 | 12/2010 |
| DE | 102017106709 A1 | 10/2018 |

\* cited by examiner

*Primary Examiner* — Flemming Saether
(74) *Attorney, Agent, or Firm* — Husch Blackwell LLP

(57) ABSTRACT

An adjusting device for adjusting a light module in a vehicle lighting device. The adjusting device includes an adjusting mechanism into which a rotary motion can be transmitted. The adjusting device also includes a transmission element that can be used to transfer the rotary motion. The adjusting mechanism and the transmission element are connected in a way that transmits torque via a coupling that provides torque overload protection. The adjusting mechanism is embodied with at least two parts and features a first part into which a rotary motion can be transmitted and it features a second part that is embodied as a part of the coupling.

7 Claims, 2 Drawing Sheets

ADJUSTING DEVICE FOR ADJUSTING A LIGHT MODULE IN A VEHICLE LIGHTING DEVICE

CROSS REFERENCE

This application claims priority to German Patent Application 10 2018 102339.1, filed Feb. 2, 2018, the entirety of which is hereby incorporated by reference.

FIELD OF THE INVENTION

This inventive object involves an adjusting device for adjusting a light module in a vehicle lighting device, with an adjusting mechanism into which a rotary motion can be transmitted, and with a transmission element that can be used to transfer the rotary motion, and where the adjusting mechanism and the transmission element are connected in a way that transmits torque via a coupling that provides torque overload protection.

BACKGROUND

DE 20 2010 011 852 U1 describes an adjusting device for adjusting a light module in a vehicle lighting device, and an adjusting mechanism is specified that is connected to a transmission element via a coupling. The coupling features torque overload protection, which prevents torque from being transferred to the transmission element via the coupling when an end stop is reached or due to another type of blockage when there is a further increase in the torque in the adjusting mechanism. Once the torque reaches a limit value, the essentially coupling snaps together, and the rotary motion of the adjusting mechanism is no longer transmitted to the transmission element. This process achieves torque overload protection, where a simple, torque-transmitting connection between the adjusting mechanism and the transmission element is achieved below the torque limit value using the coupling.

If the headlamp setting is normal, the overload coupling must not be activated. Even if the headlamp settings are normal, the overload coupling should not be activated at increased ambient temperatures. For example, when maintenance is being performed on a hot engine in a workshop or if the response time is longer, the coupling should be able to transmit a specified maximum torque. Particularly for different headlamps with different torque requirements, a coupling that typically only includes plastic components cannot be readjusted. Specifically, manufacturers cannot use uniform couplings for different adjusting devices.

Particularly through the use of plastic for malleable parts, which are formed by the snap arms that surround the knurled detent, it is difficult to configure a specified torque for maximum transmission, even during the design phase. In addition, this results in a low level of thermal shock resistance over time. Specifically, the maximum transmissible torque is reduced frequently over time. The result is that the adjusting device can no longer be operated as required, particularly in older vehicle lighting devices.

On the other hand, the flexibility of the material that is selected cannot be much lower. A user might do this in an effort to make the design of the coupling with several spring arms softer because a tool holder is integrated in the adjusting mechanism. In turn, a tool such as an Allen key can be inserted into the tool holder. If the plastic chosen for the adjusting mechanism is too soft, the tool holder can be damaged when a tool is being used. This substantially limits the material selection for forming the adjusting mechanism.

SUMMARY OF THE INVENTION

The purpose of the invention is the further embodiment of an adjusting device with an improved coupling. Specifically, a coupling should be created that can be used to set the transmissible torque such that it is constant across a wide temperature range.

The invention includes the technical contribution that the adjusting mechanism is embodied with at least two parts and features a first part into which a rotary motion can be transmitted and features a second part that is embodied as a part of the coupling. With respect to the invention, the two-part design specifically refers to two parts that can be disconnected from each other, but which can also be connected mechanically or using an adhesive substance, where the first part and second part do not have any interlocking parts with a uniform structure.

The central concept of the invention is the option of an expanded material selection for the adjusting mechanism, which ensures that a first material can be used for the first part of the adjusting mechanism and a second material that differs from the first material can be used for the second part of the adjusting mechanism. The advantage is that the second part of the coupling can fulfill different material requirements than the first part of the adjusting mechanism in which a component such as a tool holder is integrated.

As a result, the advantage is that the coupling has a metal spring element, which is embodied using the second part of the adjusting mechanism and which includes at least one spring arm that, on the outside, surrounds a detent section embodied with detent cams of the transmission element at least in sections. This now lets the user substitute plastic spring arms, which are designed with the first part of the adjusting mechanism as a single part and have the same material, with a spring element that can be embodied from a metal material. To this end, with respect to the invention, the metal spring element must be securely connected to the first part of the adjusting mechanism, e.g. using a snap-in connection. In addition, a rotary motion of the first part of the adjusting mechanism also generates a rotary motion of the metal spring element around an adjustment axis. The minimum of one spring arm or, preferably, several spring arms, which are evenly arranged across the circumference of the spring element, can interact in the usual way with the detent cams of the detent section, where the detent section is arranged on the transmission element together with the detent cams, and are embodied specifically as a single part with uniform material with the other transmission element.

The adjusting device equipped with the inventive design of the coupling for adjusting a light module in a vehicle lighting device results in the advantage that the first part of the adjusting mechanism can be manufactured from any material, especially plastic, and the material selection of the first part of the adjusting mechanism does not have an effect on the latching behavior of the coupling and, as the second part of the adjusting mechanism, the metal spring element has a substantially lower temperature influence on the torque transmission behavior of the coupling. The coupling can maintain a constant torque limit value across a wide temperature range. When this limit value is reached, the spring arms can slide off the detent cams, and the coupling essentially spins around. The detent section of the transmission element can be manufactured from plastic using conventional methods, and the substantial influence on the torque behavior of the coupling is the result of the constant spring rigidity of the spring element, which is largely unaffected by temperature.

One crucial advantage is that the first part of the adjusting mechanism features a plastic material and has a tool holder in which a tool for transmitting torque into the adjusting mechanism can be installed. For example, the first part of the adjusting mechanism can be manufactured from a plastic with a low degree of flexibility, such as POM. Thanks to the inventive further embodiment of the coupling, material selection has no influence on the torque behavior. Specifically, the tool holder can be embodied in a more durable design to ensure that it is not damaged, even during frequent use and across a wide temperature range and particularly after an extended period of use of the vehicle lighting device, even when it is used repeatedly.

An additional advantage is that the adjusting mechanism has a holder recess in which the spring element is at least placed in sections, where the holder recess, with reference to an adjustment axis, is embodied opposite to the tool holder in the first part of the adjusting mechanism. For example, the spring element can be held with an elementary section in the holder recess and securely arranged in this section, and the string arms protrude from an opening side of the holder recess and, in turn, from the adjusting mechanism.

A special advantage is that the spring element can be integrated at variable depths into the holder recess, where the spring arms have a higher spring rigidity when the installation depth is deep and a lower spring rigidity when the installation depth is shallow. This means that the deeper the spring element is snapped into the holder recess, the higher the rigidity of the spring arms is, and the higher the rigidity of the spring arms is, the lower the resulting flexibility is. Therefore, if the spring element is introduced very deeply into the holder recess and latched in it, for example, high torques can be transmitted, because the spring arms have only a small free spring length. If the insertion depth of the spring element into the holder recess is selected at a lesser value, and the spring arms protrude further from the holder recess, its rigidity is lower and only lower torques can be transmitted. This results in an ability to adjust the transmissible torques by inserting the spring element into the holder recess at various depths. In addition, various first parts of the adjusting mechanism can be provided, which, in particular, have holder recesses of various depths and can be combined with different second parts of the adjusting mechanism to form a respective spring element.

An additional advantage is that the spring element has a spring body manufactured from a press-bent component. Here, several spring arms can be arranged across the circumference of the spring element around the adjustment axis. The spring arms are connected to each other via side ribs and form the single-part spring body to ensure that the spring element can be manufactured from a single-part press-bent component.

Another advantage is that the spring arms face toward the raised detents that are in contact with the detent cams. In turn, the raised detents are oriented toward these detent cams. The raised detents are embodied such that, for example, they correspond to the gaps between the detent cams of the detent section. If too high a torque is applied to the coupling, the raised detents of the spring arms can lift from the intermediate spaces of the detent cams and jump over them.

It is also an advantage if the spring element has at least one detent protrusion, which is engaged in at least one detent opening, where the detent opening is made in a wall of the first part of the adjusting mechanism that surrounds the holder recess. Specifically, several pairings of detent protrusions and detent openings can be embodied between the spring element and holder recess, and if the spring element is pressed into the holder recess of the first part of the adjusting mechanism, the detent protrusions can engage in the detent openings. This forms a secure connection of the spring element to the first part of the adjusting mechanism.

Another advantage is that the transmission element is formed from a plastic, where the detent section is embodied in one part with the detent cams and in a uniform material with the transmission element. As a result, the detent section with detent cams is also made from a plastic material.

Another advantage is gained if the spring body of the spring element is embodied in a rectangular design around the adjustment axis, where the holder recess in particular features a cross section form in the shape of a rectangle around the adjustment axis. This allows the spring body to be easily inserted into the holder recess, where transmission of higher levels of torque is possible between the first part of the adjusting mechanism and the spring body due to the rectangular design.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
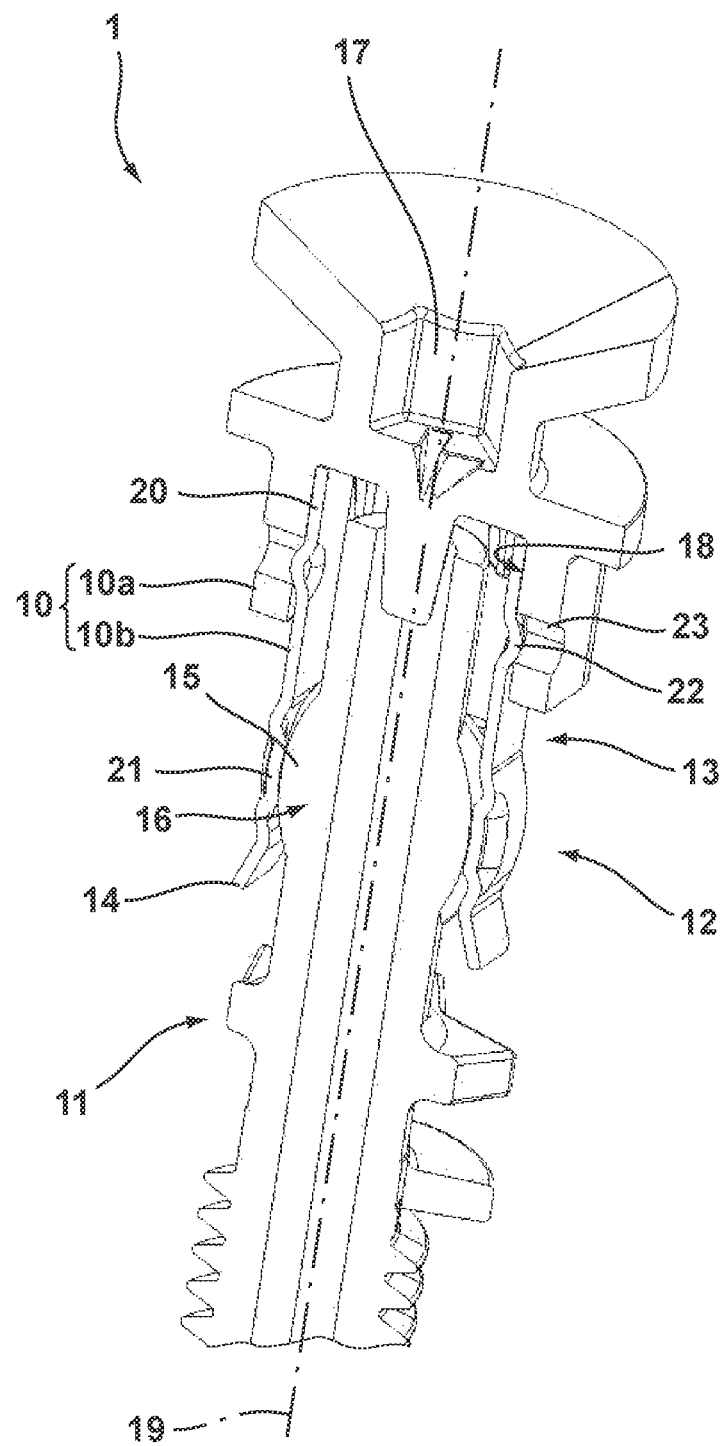
FIG. 1 is a perspective cross section view of the adjusting device with the features of the invention.

FIG. 1 depicts a cross section view of an embodiment of an adjusting device 1 for adjusting a light module in a vehicle lighting device. The adjusting device 1 features an adjusting mechanism 10, which includes a first part 10a and a second part 10b, where, for example, the latter can be held in a corresponding opening in the housing of the vehicle lighting device such that it can be rotated. The first part 10a of the adjusting mechanism 10 contains a tool holder 17 in which a tool can be inserted from the outside of the vehicle lighting device, and a rotary motion of the adjusting mechanism 10 can be generated around an adjustment axis 19 via the tool holder 17.

The rotary motion of the adjusting mechanism 10 can be transmitted to a transmission element 11, and the transmission element 11 transmits the rotary motion further to a corresponding device in the vehicle lighting device in order to adjust the slope of a light module in the housing of the vehicle lighting device. The connection between the adjusting mechanism 10 and the transmission element 11 features a coupling 12 that ensures that starting at a limit torque that is introduced via the tool holder 17 into the adjustment mechanism 10, this is not conveyed to the transmission element 11. As such, the coupling 12 is embodied as an overload coupling.

In accordance with the invention, the adjusting mechanism 10 is embodied with at least two parts and features a first part 10a into which a rotary motion can be transmitted and it features a second part 10b that is embodied as a part of the coupling 12. This creates the option of an expanded material selection for the adjusting mechanism 10, which ensures that a first material can be used for the first part 10a of the adjusting mechanism and a second material that differs from the first material can be used for the second part 10b of the adjusting mechanism 10. The advantage is that the second part 10b of the coupling 12 can fulfill different material requirements than the first part 10a of the adjusting mechanism 10 in which a component such as a tool holder 17 is integrated.

Specifically, the coupling 12 features a metal spring element 13 formed by the second part 10b, which is securely connected to the first part of the adjusting mechanism 10, and when the first part 10a of the adjusting mechanism 10 rotates around the adjustment axis 19, the spring element 13 also rotates around the adjustment axis 19, where the spring element 13 forms the second part 10b of the adjustment element 10. The spring element 13 features several spring arms 14 that interact with a detent section 16 of the transmission element 11. The detent section 16 features several detent cams 15, which form a knurl on the outside, and the spring arms 14 can snap in place in the gaps between the detent cams 15. If the torque between the adjusting mechanism 10 and the transmission element 11 exceeds a limit value, then the spring arms 14 of the spring element 13 deflect radially outward and then slide off the detent cams 15 together with their raised detents 21. As a result, an additional rotary motion of the adjusting mechanism 10 is not transmitted to the transmission element 11.

The spring element 13 with spring arms 14 is embodied from a metal press-bent component and features a single-part spring body 20. It is inserted into a holder recess 18, which is embodied in the first part 10a of the adjusting mechanism 10, and which is located on the opposite side to the embodiment of the tool holder 17. In order to achieve a captive arrangement of the spring element 13 in the holder recess 18, the spring element 13 has several detent protrusions 22 that are engaged in detent openings 23, and the detent openings 23 are located in a wall of the first part 10a of the adjusting mechanism 10 that surrounds the holder recess 18.

The first part 10a of the adjusting mechanism 10 and the transmission element 11 can be manufactured from plastic using conventional methods, specifically an injection molding procedure. The metal press-bent component that forms the spring body 20 of the spring element 13 interacts with the detent section 16, which is also embodied from plastic, to ensure that a steelplastic connection is established for the slide pairing of the coupling 12. With respect to the coupling 12, the spring arms 14 constitute its moving components. As a result, the coupling 12 can attain a specific temperature resistance, ensuring that the maximum transmissible torque remains constant across a wide temperature range. Specifically, material selection for production of the adjusting mechanism 10 can be performed independently of the production process for the parts on the coupling 12 that are active, particularly the spring element 13.

Figure 2:
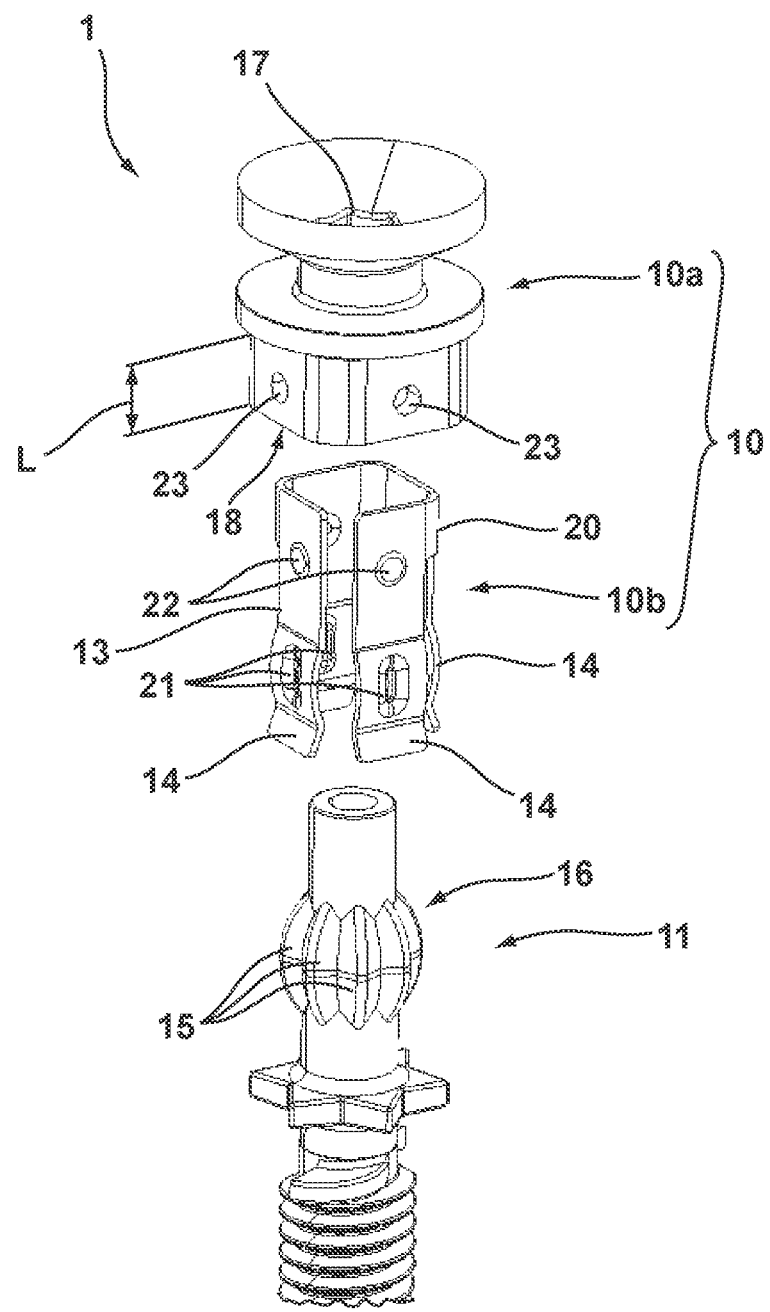
FIG. 2 is a bird's eye view of the adjusting device components.

FIG. 2 shows a bird's eye view of the adjusting device 1 with its components. At the top, the adjusting mechanism 10 is shown together with the first part 10a with the tool holder 17 and the bottom holder recess 18, and there are several detent openings 23 in the wall of the holder recess 18. The holder recess 18 features a concealed cross section that is mostly rectangular.

The spring element 13 formed by the second part 10b of the adjusting mechanism 10 can be inserted into the holder recess 18 until the detent protrusions 22 on the spring element 13 snap into the detent openings 23 in the holder recess 18. As such, the spring arms 14 only protrude a portion of their length from the bottom of the first part 10a of the adjusting mechanism 10, which increases the rigidity of the spring arms 14. As a result, the rigidity can be determined by the holder length L, through which the spring element 13 can be inserted into the holder recess 18. A long holder length L results in a shorter length of the spring arms 14 protruding from the first part 10a of the adjusting mechanism 10, which increases the rigidity of the spring arms 14, and makes it harder for the spring arms 14 with raised detents 21 to slide off the detent cams 15 of the detent section 16, which is embodied on the transmission element 11.

The spring element 13 is embodied from a metal press-bent component and as a single part in which the spring body 20 has ribs between the spring arms 14 that connect them into a single assembly. This results in a simple assembly of the spring element 13 in or on the first part 10a of the adjusting mechanism 10, and after assembly, the unit consisting of the spring element 13 and the first part 10a of the adjusting mechanism 10 can be actively connected with the detent section 16 of the transmission element 11.

In its embodiment, the invention is not limited solely to the preferred embodiment described above. On the contrary, a number of variants that use the solution as represented above are conceivable, even on designs that are fundamentally different. All characteristics and/or advantages resulting from the claims, the description or the drawings, including design details, arrangements in space and process steps, can be essential for the invention on their own as well as in any combination.

LIST OF REFERENCE SIGNS

1 Adjusting device
10 Adjusting mechanism
10a First part of the adjusting mechanism
10b Second part of the adjusting mechanism
11 Transmission element
12 Coupling
13 Spring element
14 Spring arm
15 Detent cams
16 Detent section
17 Tool holder
18 Holder recess
19 Adjustment axis
20 Spring body
21 Raised detent
22 Detent protrusion
23 Detent opening
L Holder length

The invention claimed is:

1. An adjusting device for adjusting a light module in a vehicle lighting device, the adjusting device comprising:
    an adjusting mechanism into which a rotational motion is transmitted, the adjusting mechanism including each of a first part into which the rotational motion is initiated and a second part;
    a transmission element to transfer the rotational motion;
    a coupling formed from the second part of the adjusting mechanism connected to the transmission element to transmit torque for torque overload protection;
    wherein the coupling includes a metal spring element embodied as the second part of the adjusting mechanism, the metal spring element including at least one spring arm;
    wherein the transmission element includes a detent section embodied with one or more detent cams;

wherein the at least one spring arm surrounds at least one of the one or more detent cams;

wherein the spring element includes a spring body that is manufactured from a press-bent component wherein a plurality of spring arms are distributed along a circumference of an adjustment axis on the spring body;

wherein the spring body of the spring element is embodied in a rectangular design around the adjustment axis, and wherein a holder recess features a cross section form in the shape of a rectangle around the adjustment axis.

2. The adjusting device in accordance with claim 1, wherein the first part of the adjusting mechanism is embodied as plastic and includes a tool holder in which a tool for transmitting the rotary motion into the adjusting mechanism can be attached.

3. The adjusting device in accordance with claim 2, wherein the first part of the adjusting mechanism has a holder recess in which the metal spring element is placed, and wherein the holder recess is positioned and located opposite to the tool holder in the first part of the adjusting mechanism along an adjustment axis.

4. The adjusting device in accordance with claim 3, wherein when the spring element is introduced into the holder recess the spring arms have a greater spring rigidity at a deep installation depth and a smaller spring rigidity at a shallow installation depth.

5. The adjusting device in accordance with claim 3, wherein the spring element has at least one detent protrusion, the at least one detent protrusion being engageable with an at least one detent opening in a wall of the second part.

6. The adjusting device in accordance with claim 2, wherein the spring arms have raised detents that face towards the detent cams, and the raised detents are oriented toward the detent cams.

7. The adjusting device in accordance with claim 2, wherein the transmission element is formed from a plastic and wherein the detent section is embodied in one part with the detent cams and in a uniform material with the transmission element.

* * * * *